(12) United States Patent
Ko et al.

(10) Patent No.: US 7,500,141 B2
(45) Date of Patent: Mar. 3, 2009

(54) SAVING STATE DATA IN PARALLEL IN A MULTI-PROCESSOR SYSTEM

(75) Inventors: Wenjeng Ko, Tucson, AZ (US); Cheng-Chung Song, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 11/288,714

(22) Filed: Nov. 29, 2005

(65) Prior Publication Data

US 2007/0168760 A1 Jul. 19, 2007

(51) Int. Cl.
*G06F 11/00* (2006.01)

(52) U.S. Cl. .............................. 714/15; 714/21; 714/45; 714/48

(58) Field of Classification Search .................... 714/15, 714/21, 45, 48
See application file for complete search history.

(56) References Cited

U.S. PATENT DOCUMENTS 5,619,644 A * 4/1997 Crockett et al. ............... 714/45
5,765,207 A 6/1998 Curran
5,862,316 A * 1/1999 Hagersten et al. ............. 714/15
2004/0196905 A1 10/2004 Yamane et al.

FOREIGN PATENT DOCUMENTS

EP 0455946 11/1991

* cited by examiner

*Primary Examiner*—Robert Beausoliel
*Assistant Examiner*—Charles Ehne
(74) *Attorney, Agent, or Firm*—Dan Shifrin

(57) ABSTRACT

A method, system and program product save state data in a multi-processor system. A problem in the multi-processor system is detected and a statesave thread is spawned for each processor in the system. Each statesave thread directs a processor, in parallel with the other processors to attempt to identify a component in the system having a status of "incomplete", indicating that state data of the component remains to be offloaded. When a component having a status of "incomplete" is identified, the processor executes statesave code to offload state data from the identified component. Upon completion of the state data offload from the identified component, the processor changes the status of the component to "complete". The foregoing processes are repeated until no components are identified in the system having a status of "incomplete".

16 Claims, 3 Drawing Sheets

SAVING STATE DATA IN PARALLEL IN A MULTI-PROCESSOR SYSTEM

TECHNICAL FIELD

The present invention relates generally to data processing systems and, in particular, to offloading state data logged by software components in multi-processor systems.

BACKGROUND ART

Data processing systems or subsystems typically include numerous software components managing different aspects of the operation of the system. For example, components in a storage controller subsystem may include an operating system, device drivers, device adapters, host adapters and cache management, to name just a few. During normal operations, each component maintains a continuous log of state data. When the system encounters a significant problem, such as an event requiring a warmstart, the state data can be offloaded to a central buffer and subsequently saved to a non-volatile memory for later analysis and debugging. As illustrated in FIG. 1, in a conventional offload process, the components are called sequentially to save and offload their state data. FIG. 1 assumes that component A requires 350 milliseconds (ms) to perform a statesave operation and component B requires 620 ms. When the offload process is performed in the conventional manner, a total of 970 ms are required. With many components and much state data to offload from each, it will be appreciated that the actual process may be time consuming, thereby delaying the system recovery.

Many types of systems or subsystems include units with multiple processors which are used to execute various functions during the normal operation of the unit. However, the conventional offload process summarized above is conducted by only a single processor, leaving the other processors idle.

SUMMARY OF THE INVENTION

The present invention includes a method, a multi-processor system and a program product for making full use of multiple processors to save state data from the components in parallel. The method includes detecting a problem in the multi-processor system and for each processor in the system, spawning a statesave thread. Each statesave thread directs a processor, in parallel with the other processors to attempt to identify a component in the system having a status of "incomplete", indicating that state data of the component remains to be offloaded. When a component having a status of "incomplete" is identified, the processor executes statesave code to offload state data from the identified component. Upon completion of the state data offload from the identified component, the processor changes the status of the component to "complete". The foregoing steps are repeated by the processors until no components are identified in the system having a status of "incomplete".

The system includes a plurality of processors, including a first processor, a plurality of software components, each logging state data comprising a sequential history of states of the component, a buffer, a master thread configured to detect a problem in the system and a statesave thread spawned to each of the plurality of processors by the master thread upon detection of a problem. Each statesave thread directs a processor, in parallel with the other processors, to attempt to identify a component in the system having a status of "incomplete", indicating that state data of the component remains to be offloaded. When a component having a status of "incomplete" is identified, the processor is to execute statesave code to offload state data from the identified component. Upon completion of the state data offload from the identified component, the processor is to change the status of the component to "complete". The statesave threads direct the processor to repeat the foregoing until no components are identified in the system having a status of "incomplete".

The computer program product of a computer readable medium is usable with a programmable computer and has computer-readable code embodied therein for saving state data in a multi-processor system. The computer-readable code includes instructions for detecting a problem in the multi-processor system and for each processor in the system, spawning a statesave thread. Each statesave thread directs a processor, in parallel with the other processors to attempt to identify a component in the system having a status of "incomplete", indicating that state data of the component remains to be offloaded. When a component having a status of "incomplete" is identified, the processor executes statesave code to offload state data from the identified component. Upon completion of the state data offload from the identified component, the processor changes the status of the component to "complete". The foregoing instructions are repeated until no components are identified in the system having a status of "incomplete".

DETAILED DESCRIPTION OF THE PREFERRED EMBODIMENT

Figure 2:
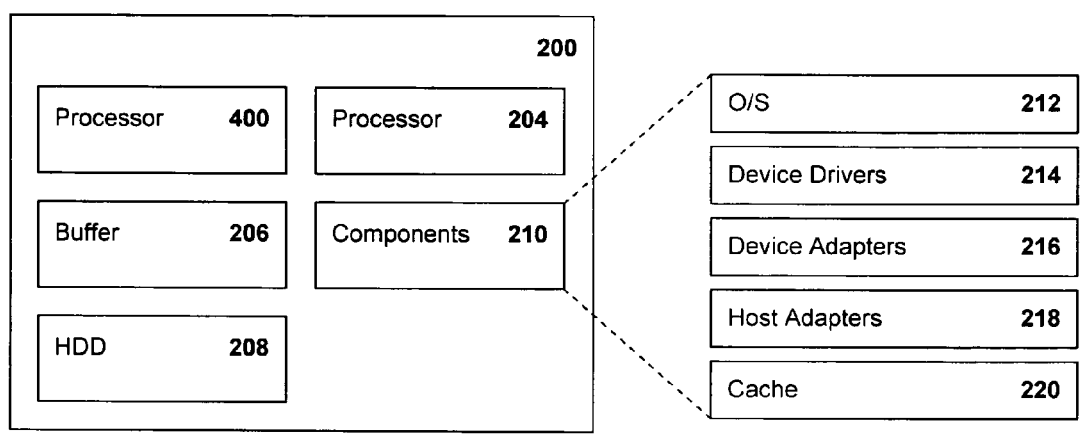
FIG. 2 is a block diagram of a multi-processor system in which the present invention may be implemented.

FIG. 2 is a block diagram of a multi-processor system 200, such as a data storage controller, in which the present invention may be implemented. The system 200 includes two processors 400 and 204. For clarity, only two processors 400, 204 are illustrated and described; however, the present invention may be implemented in a system with more than two processors. The system 200 further includes a buffer 206, non-volatile storage device, such as a hard disk drive (HDD) 208 and software components 210. Such components may include an operating system 212, a plurality of device drivers (collectively labeled as 214), a plurality of device adapters (collectively labeled as 216), a plurality of host adapters (collectively labeled as 218), a cache manager 220 and others (not shown).

Figure 3:
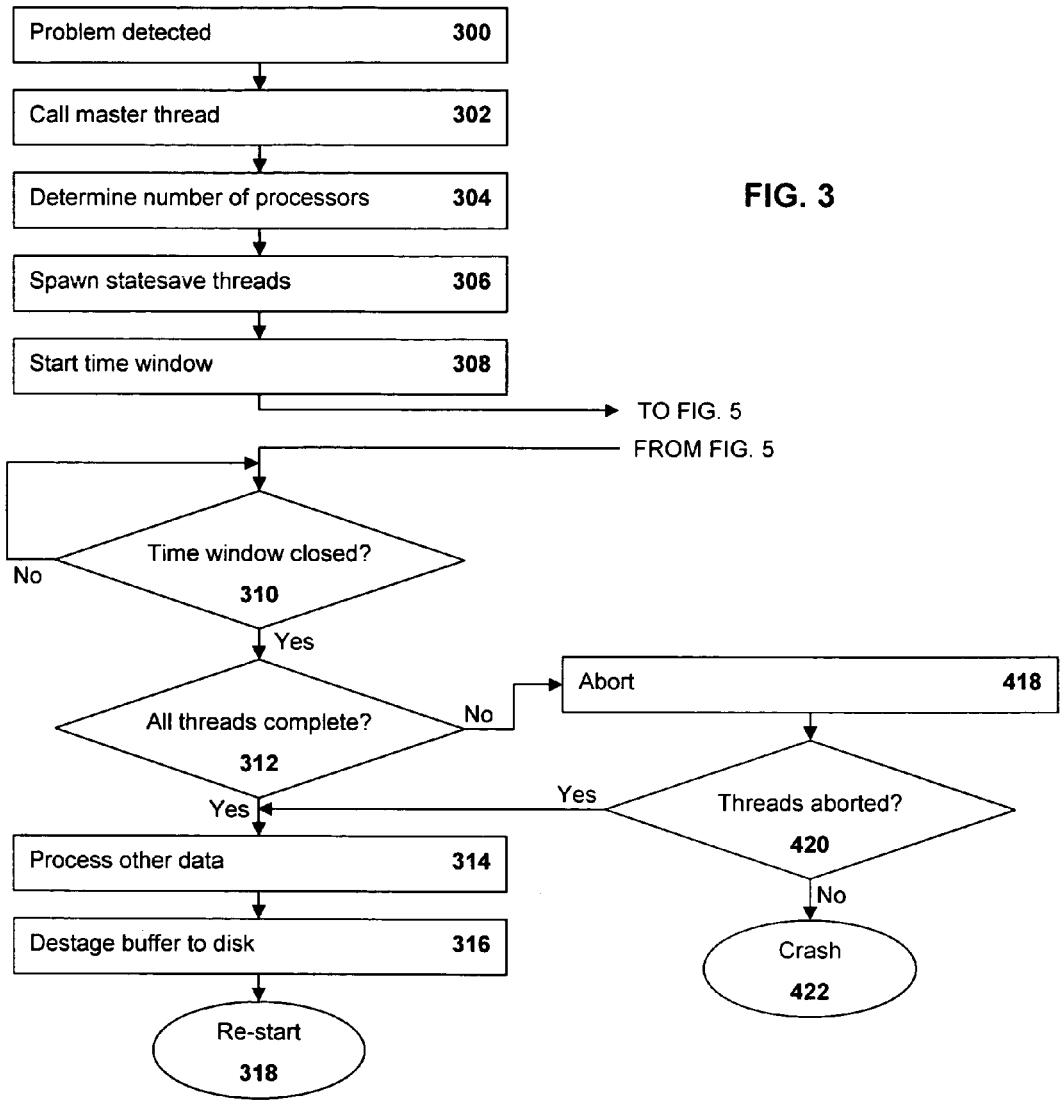
FIG. 3 is a flowchart of a master thread of the present invention.
Figure 4:
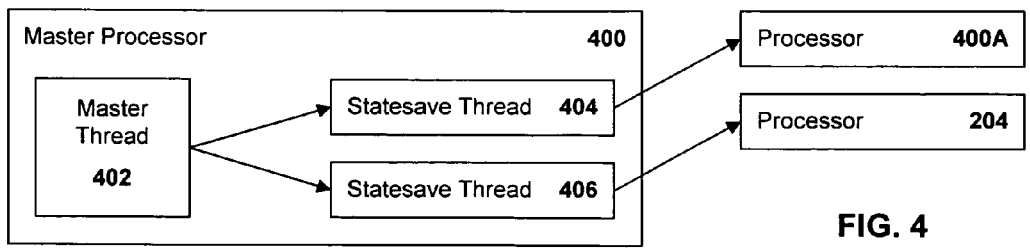
FIG. 4 is a functional representation of a master processor in the multi-processor system of FIG. 2.

Referring to the flowchart of FIG. 3, in operation one of the processors (processor 400 in the illustration but any of the processors in an actual implementation), referred to herein as the master processor, is configured to detect problems in the system, particularly significant problems which would necessitate a warmstart or coldstart of the system 200 (step 300). FIG. 4 is functional representation of the master processor 400. Upon detection of such a problem, the master processor 400 calls a master statesave driver thread (step 302; element 402). Pursuant to the master thread 402, the master processor 400 determines the number of processors in the system (step 304) and spawns as many component statesave threads as there are processors (step 306). In the present example, two statesave threads 404 and 406 are spawned, one for one of the processors 204 and the other for the master processor 400, acting in this instance as a "normal" processor (hereinafter referred to in this capacity as processor 400A to distinguish operations in its capacity as the master processor 400). Preferably, a timing window also opens (step 308) within which the statesave threads are to be completed. After a predetermined time, the timing window closes (step 310), and a determination is made as to whether all of the statesave threads have returned as having been completed (step 312). If so, the master processor 400 processes other data (step 314) and destages data from the buffer to the HDD 208 (step 316), before initiating an appropriate re-start (step 318). If not all of the statesave threads have been completed in the allotted time, the master processor 400 issues a command to the processors 400A, 204 to abort the statesave thread (step 418) and waits for confirmations to be returned. If all of the statesave threads are aborted (step 320), the master processor 400 returns to process other data (step 314) and then destages the buffer to the HDD 208 (step 316) and restarts (step 318). Otherwise, the master processor 400 forces a hard "crash" (step 422) and issues appropriate notices to a system administrator.

Figure 5:
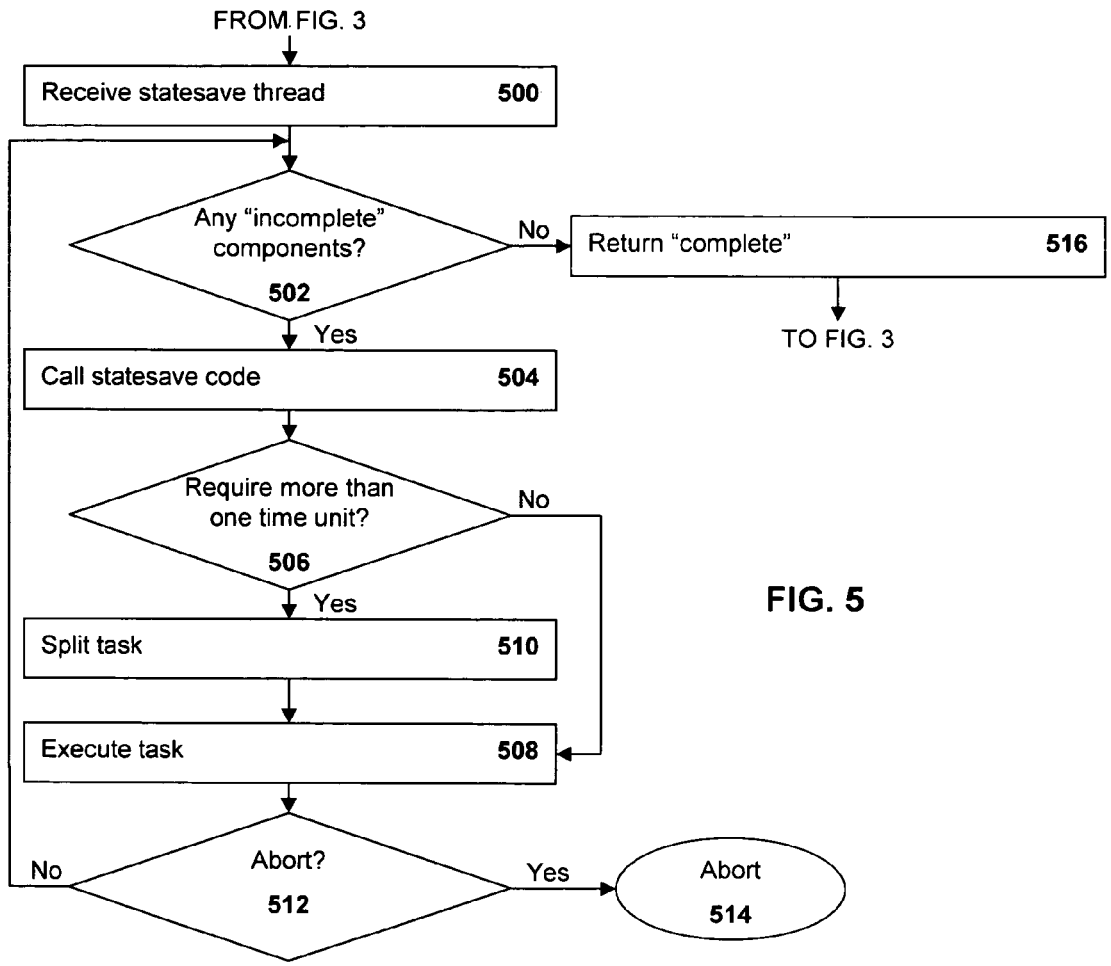
FIG. 5 is a flowchart of a statesave thread of a method of the present invention.

Referring now to the flowchart of FIG. 5, when each processor 400A, 204 receives its statesave thread 404, 406, respectively, (step 500), each attempts to identify any components 212-220 having any state data which has not yet been offloaded (step 502). Components may be identified by a status indicator, or its functional equivalent, in the "incomplete" state when state data is present to be offloaded or in the "complete" state when no state data remains to be offloaded. When a component with data to be offloaded is identified, statesave code is called (step 504) containing state data offload instructions (statesave task instructions). Although the logged state data may be offloaded from some of the components 212-220 in a relatively short period of time, state data from other components may require a longer time. Thus, if a first processor 400A completes the offload of state data from one of the components before the other processor 204 completes the offload of state data from another of the components and there are no other components having an "incomplete" status, the processor 400A will be idle until the other processor 204 completes the offload from its associated component. Preferably, therefore, in one embodiment the statesave thread directs each processor 400A, 204 to determine if the statesave task will require more than one predefined time unit to complete (step 506). The time unit is chosen to be short enough to permit the processor to quickly respond to a new emergent task yet long enough that the statesave task may be completed within a relatively few time units. With the statesave thread 404 executing on the processor 400A, if the processor 400A determines that the statesave task can be completed within one time unit, execution of the task proceeds and the state data is offloaded from the component to the buffer 206 (step 508). The status of the component is then changed to "complete".

If, on the other hand, the processor 400A determines that the statesave task from a component cannot be completed within one time unit, the state data will be split into smaller portions $P_1, P_2, \ldots P_n$ (step 510), each taking up to one time unit to offload. The processor 400A executes the statesave code on the first portion $P_1$ of state data on component 220 (step 508). Meanwhile, the other processor 204 is executing statesave code offloading state data from another component. When the processor 400A has completed offloading the first portion $P_1$ of state data, it determines whether an abort command has been issued by the master processor 400 (step 512). If so, the statesave thread ends (step 514) and an appropriate acknowledgment returned to the master processor 400. Otherwise, the statesave code returns to attempt to identify any component with an "incomplete" status (step 502). In the present example, if the other processor 204 has not begun to offload the second portion $P_2$ of the state data from the component 212, the first processor 400A will do so. The process is repeated until no component have state data remaining to be offloaded. The statesave thread 404 then returns a "complete" notice to the master processor 400 (step 516).

Alternatively, a processor may offload state data from a component during one time unit. Any remaining data is offloaded by any processor during one or more subsequent time units.

Figure 1:
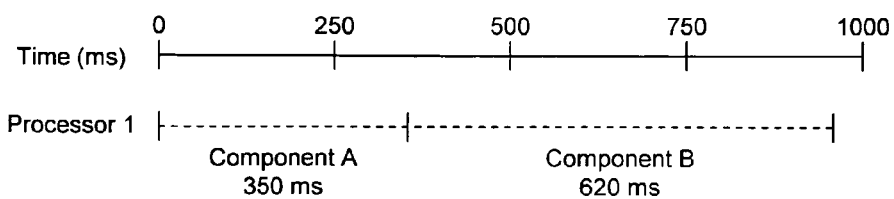
FIG. 1 illustrates a prior art sequence of offloading state data from two components.
Figure 6:
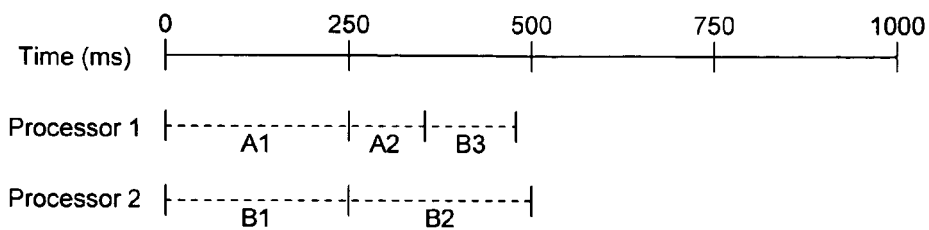
FIG. 6 illustrates a sequence of offloading state data from two components according to the present invention.

FIG. 6 illustrates a sequence of offloading state data from two components according to the present invention. As in the example of FIG. 1, component A requires 350 milliseconds to perform a statesave operation and component B requires 620 milliseconds. However, in accordance with one aspect of the present invention, instead of the two statesave operations being performed sequentially by a single processor, they are split into smaller portions executed in parallel by multiple processors. In the example, the time unit has been defined as being 250 milliseconds (ms). The task of offloading the state data from the first component is split into two portions of 250 ms and 100 ms. The task of offloading the state data from the second component is split into three portions of 250 ms, 250 ms and 120 ms. The first and second processors offload the respective first portions of state data from the two components in the first 250 ms time unit. In the second time unit, the second processor offloads the second portion of state data from the second component and the first processor offloads the second (and last) of state data from the first component in the first 100 ms. The remaining 120 ms portion of state data from the second component is then offloaded by the first processor, still in the second time unit, employing what would otherwise be idle time. Thus, in accordance with the present invention the entire offload process in the example of FIG. 6 requires only 500 ms, a savings of 470 ms over the prior art sequential method.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for saving state data in a multi-processor system.

What is claimed is:

1. A method for saving state data in a multi-processor system, the system including a plurality of software components each maintaining a log of state data, the method comprising:

detecting a problem in a multi-processor system requiring that the state data of each component be offloaded to a central buffer; and for each processor in the system, spawning a corresponding statesave thread directing the processor in parallel with each other processor to:
   a) attempt to identify a component in the system having a status of "incomplete", indicating that state data of the component remains to be offloaded;
   b) when the processor identifies a component in the system having a status of "incomplete", execute a statesave code to offload state data from the identified component to the central buffer;
   c) upon completion of the state data offload from the identified component, change the status of the component to "complete"; and
   d) repeat steps a) through c) until no components are identified in the system having a status of "incomplete".

2. The method of claim 1, wherein each spawned statesave thread further directs the corresponding processor to:
   prior to executing the statesave code, determine if the state data can be offloaded within a predetermined period of time;
   if the state data can be offloaded within the predetermined period of time:
      execute the statesave code to offload the state data to the central buffer; and
      upon completion of the state data offload, change the status of the component to "complete"; and
   if the state data cannot be offloaded within the predetermined period of time:
      split the state data into a plurality of portions, each portion capable of being offloaded within the predetermined period of time;
      execute the statesave code to offload a first portion of the state data; and
      leave the status of the component unchanged, whereby each remaining portion of the state data of the component is offloaded by any processor in the system.

3. The method of claim 1, wherein the spawned statesave threads further direct the processors to:
   offload a first portion of the state data if, during execution of the statesave code, the state data cannot be offloaded within a predetermined period of time; and
   leave the status of the component unchanged, whereby a second portion of the state data of the component is offloaded by any processor in the system.

4. The method of claim 1, further comprising calling a master statesave driver thread after detecting a problem in the system.

5. The method of claim 1, further comprising destaging the offloaded state data from the buffer to a non-volatile storage device.

6. The method of claim 1, further comprising:
   determining if all statesave threads executed by the processors are completed within a predetermined period of time; and
   if all statesave threads are not completed within the predetermined period of time, transmitting a command to each processor to abort all incomplete statesave threads.

7. A multi-processor system, comprising:
   a plurality of processors;
   a plurality of software components, each logging state data comprising a history of states of the component;
   a buffer;
   a master thread configured to detect a problem in the system requiring that the state data of each component be offloaded to the buffer; and
   a statesave thread spawned to each processor by the master thread upon detection of a problem and directing the processor, in parallel with each other processor, to:
   a) attempt to identify a component in the system having a status of "incomplete", indicating that state data of the component remains to be offloaded;
   b) when the processor identifies a component in the system having a status of "incomplete", execute a statesave code to offload state data from the identified component to the buffer;
   c) upon completion of the state data offload from the identified component, change the status of the component to "complete"; and
   d) repeat a) through c) until no components are identified in the system having a status of "incomplete".

8. The system of claim 7, wherein each spawned statesave thread further directs the corresponding processor to:
   prior to executing the statesave code, determine if the state data can be offloaded within a predetermined period of time;
   if the state data can be offloaded within the predetermined period of time:
      execute the statesave code to offload the state data to the central buffer; and
      upon completion of the state data offload, change the status of the component to "complete"; and
   if the state data cannot be offloaded within the predetermined period of time:
      split the state data into a plurality of portions, each portion capable of being offloaded within the predetermined period of time;
      execute the statesave code to offload a first portion of the state data to the buffer; and
      leave the status of the component unchanged, whereby each remaining portion of the state data of the component is offloaded by any processor in the system to the buffer.

9. The system of claim 7, wherein the spawned statesave threads further direct the processors to:
   offload a first portion of the state data to the buffer if, during execution of the statesave code, the state data cannot be offloaded within a predetermined period of time; and
   leave the status of the component unchanged, whereby a second portion of the state data of the component is offloaded by any processor in the system to the buffer.

10. The system of claim 7, further comprising a non-volatile storage device coupled to receive offloaded state data from the buffer.

11. A computer program product of a computer readable medium usable with a programmable computer, the computer program product having computer-readable code embodied therein for saving state data in a multi-processor system, the system including a plurality of components each maintaining a log of state data, the computer-readable code comprising instructions for:

detecting a problem in a multi-processor system requiring that the state data of each component be offloaded to a central buffer; and for each processor in the system, spawning a corresponding statesave thread directing the processor in parallel with each other processor to:
  a) attempt to identify a component in the system having a status of "incomplete", indicating that state data of the component remains to be offloaded;
  b) when the processor identifies a component in the system having a status of "incomplete", execute a statesave code to offload state data from the identified component to the central buffer;
  c) upon completion of the state data offload from the identified component, change the status of the component to "complete"; and
  d) repeat instructions a) through c) until no components are identified in the system having a status of "incomplete".

12. The computer program product of claim 11, wherein each spawned statesave thread further directs the corresponding processor to:
  prior to executing the statesave code, determine if the state data can be offloaded within a predetermined period of time
  if the state data can be offloaded within the predetermined period of time:
    execute the statesave code to offload the state data to the central buffer; and
  upon completion of the state data offload, change the status of the component to "complete"; and
  if the state data cannot be offloaded within the predetermined period of time:
    split the state data into a plurality of portions, each portion capable of being offloaded within the predetermined period of time;
    execute the statesave code to offload a first portion of the state data; and
    leave the status of the component unchanged, whereby each remaining portion of the state data of the component is offloaded by any processor in the system.

13. The computer program product of claim 11, wherein the spawned statesave threads further direct the processors to:
  offload a first portion of the state data if, during execution of the statesave code, the state data cannot be offloaded within a predetermined period of time; and
  leave the status of the component unchanged, whereby a second portion of the state data of the component is offloaded by any processor in the system.

14. The computer program product of claim 11, the computer-readable code further comprising instructions to call a master statesave driver thread after detecting a problem in the system.

15. The computer program product of claim 11, the computer-readable code further comprising instructions to destage the offloaded state data from the buffer to a non-volatile storage device.

16. The computer program product of claim 11, the computer-readable code further comprising instructions for:
  determining if all statesave threads executed by the processors are completed within a predetermined period of time; and
  if all statesave threads are not completed within the predetermined period of time, transmitting a command to each processor to abort all incomplete statesave threads.

* * * * *